US011354375B2

(12) United States Patent
Kessee et al.

(10) Patent No.: US 11,354,375 B2
(45) Date of Patent: *Jun. 7, 2022

(54) METHODS AND SYSTEMS FOR PROVIDING AUTHENTICATED ONE-CLICK ACCESS TO A CUSTOMIZED USER INTERACTION-SPECIFIC WEB PAGE

(71) Applicant: Capital One Services, LLC, McLean, VA (US)

(72) Inventors: DiAndrea Kessee, Flower Mound, TX (US); Lingyu Chu, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/895,162

(22) Filed: Jun. 8, 2020

(65) Prior Publication Data

US 2020/0301993 A1 Sep. 24, 2020

Related U.S. Application Data

(63) Continuation of application No. 15/994,416, filed on May 31, 2018, now Pat. No. 10,719,570.

(51) Int. Cl.
| | |
|---|---|
| *G06F 16/957* | (2019.01) |
| *G06F 16/955* | (2019.01) |
| *G06Q 20/40* | (2012.01) |
| *G06F 21/44* | (2013.01) |

(Continued)

(52) U.S. Cl.
CPC ........ *G06F 16/9577* (2019.01); *G06F 16/955* (2019.01); *G06F 16/9558* (2019.01);
(Continued)

(58) Field of Classification Search
CPC ............... G06F 16/955; G06F 16/9558; G06F 16/9566; G06F 16/9574; G06F 16/9577;
(Continued)

(56) References Cited

U.S. PATENT DOCUMENTS 9,271,110 B1 * 2/2016 Fultz .................... H04W 12/06
9,607,336 B1   3/2017 Dean
(Continued)

OTHER PUBLICATIONS

"How to Create Alert, Prompt, Confirm Dialog Boxes Using JavaScript?" Feb. 25, 2018, WebNotes, pp. 11 (Year 2018).
(Continued)

*Primary Examiner* — Chau T Nguyen
(74) *Attorney, Agent, or Firm* — Troutman Pepper Hamilton Sanders LLP; Christopher J. Forstner; John A. Morrissett

(57) ABSTRACT

A method including receiving an indication for a digital alert associated with a specific action for a user account of a user; generating and outputting a first message comprising a web page link; receiving an indication of a request to access the web page link by the user device; responsive to receiving the indication of the request to access the web page link, accessing, based on the indication for a digital alert, user-specific information associated with the user account from the at least one third-party device; and generating, based on the indication for a digital alert and the user-specific information, a customized user interaction-specific web page comprising the user-specific information associated with the user account and at least one user input field.

20 Claims, 6 Drawing Sheets

(51) Int. Cl.
*G06F 21/30* (2013.01)
*G06F 21/31* (2013.01)
*G06F 21/45* (2013.01)
*H04L 9/40* (2022.01)

(52) U.S. Cl.
CPC ...... *G06F 16/9566* (2019.01); *G06F 16/9574* (2019.01); *G06F 21/305* (2013.01); *G06F 21/31* (2013.01); *G06F 21/44* (2013.01); *G06F 21/45* (2013.01); *G06Q 20/4016* (2013.01); *H04L 63/0815* (2013.01)

(58) Field of Classification Search
CPC ........ G06F 21/305; G06F 21/31; G06F 21/44; G06F 21/45; G06Q 20/3221; G06Q 20/3821; G06Q 20/4014; G06Q 20/4016; H04L 63/0815
See application file for complete search history.

(56) References Cited

U.S. PATENT DOCUMENTS

| | | |
|---|---|---|
| 2006/0156385 A1 | 7/2006 | Chiviendacz et al. |
| 2007/0011261 A1 | 1/2007 | Madams et al. |
| 2009/0081989 A1 | 3/2009 | Wuhrer |
| 2010/0095357 A1 | 4/2010 | Willis et al. |
| 2010/0257102 A1* | 10/2010 | Perlman ............... G06Q 20/123 705/75 |
| 2012/0109821 A1 | 5/2012 | Barbour et al. |
| 2012/0323717 A1* | 12/2012 | Kirsch .................... G06F 21/31 705/26.1 |
| 2013/0085804 A1 | 4/2013 | Leff et al. |
| 2014/0189808 A1 | 7/2014 | Mahaffey et al. |
| 2015/0254659 A1 | 9/2015 | Kulkarni et al. |
| 2016/0005029 A1 | 1/2016 | Ivey et al. |
| 2016/0078430 A1 | 3/2016 | Douglas et al. |
| 2017/0201850 A1* | 7/2017 | Raleigh ................. G06F 3/0482 |
| 2017/0236196 A1* | 8/2017 | Isaacson ........... G06Q 30/0641 705/14.51 |
| 2017/0353436 A1* | 12/2017 | Jurss ....................... G06F 21/45 |
| 2017/0357977 A1* | 12/2017 | Pitz ........................ G06Q 20/32 |

OTHER PUBLICATIONS

"Fraud Alerts Frequently Asked Questions," Copyright 2012 Vantiv, LLC, pp. 2 (Year: 2012).

\* cited by examiner

METHODS AND SYSTEMS FOR PROVIDING AUTHENTICATED ONE-CLICK ACCESS TO A CUSTOMIZED USER INTERACTION-SPECIFIC WEB PAGE

CROSS-REFERENCE TO RELATED APPLICATIONS

This application is a continuation of, and claims priority under 35 U.S.C. § 120 to, U.S. patent application Ser. No. 15/994,416, filed May 31, 2018, the entire contents of which is fully incorporated herein by reference.

FIELD OF THE INVENTION

The presently disclosed subject matter relates generally to methods and systems for providing one-click access to a customized user interaction-specific web page and, more particularly, to methods and systems for allowing authenticated one-click interactions through customized user interaction-specific web pages.

BACKGROUND

Presently, it is common for users to have accounts associated with a plurality of businesses, such as bank accounts, credit card accounts, and the like. In the related art, when the user receives an account alert, the user must confirm his identity based on user identification and password. Other ways to confirm the user's account includes biometrics such as fingerprint identification and optical identification.

While these methods of authentication may provide secure access, it is inconvenient to require a user to enter username/password combinations or biometrics in order to respond to an account alert. For example, there may be situations where a user is indisposed or unable to provide the necessary information for authentication. For example, a user may have forgotten his username and/or password. Or in the case of biometrics, the user may lack the necessary equipment to enter biometric information, be unable to provide his fingerprint because of sullied hands, wet hands, or gloves, or be unable to provide an optical pattern in environments with limited lighting.

Accordingly, there is a need for an improved method for authenticating a user account when the user receives an account alert. More specifically, a need exists for one-click user authenticated access to an interaction specific dynamic web page configured to interact with a user account after the user receives an account alert.

SUMMARY

Aspects of the disclosed technology include methods for providing one-click access to a customized user interaction-specific web page associated with a user account. Consistent with the disclosed embodiments, the methods may include one or more user devices, processors, web servers, or APIs. The methods may further include a processor receiving an indication for a digital alert from a line of business and, in response, establishing an interactive session, wherein the interactive session comprises a session identification. The session identification provides a unique identifier associated with a user account interaction. The session identification, as part of a web link, is sent to user device as part of a digital alert, wherein a user responds to the web link. Based on the user's response to the web link, the processor receives the session identification from the user device and authenticates the interactive session. Upon authentication, the processor selects an API, for example, based on a digital alert configuration to generate a customized user interaction-specific web page. In some cases, by use of an indication for a digital alert, the processor and the line-of-business may reduce the required communication and processing load for sending digital alerts and generating user interaction-specific web pages.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

In an example scenario, an interaction specific web-page generator receives an indication for a digital alert from a line of business. The line of business could be, for example, a credit card company and the indication for the digital alert could be an indication for a fraud alert for a user's credit card account. The generator creates and transmits a message to a user device (e.g., smartphone) alerting the user of the potential fraud. The generator is notified when the user clicks on a link within the message, and the generator authenticates the user's response. The authentication occurs without the user being required to provide a username/ password combination or any biometric data. Upon authentication, the generator informs the business that the user has clicked on the link. The business provides the generator with account specific information corresponding to the alert, and the generator generates a user interaction-specific web page, and directs the user thereto. The web page allows the user to input certain responses that affect the user's account. For example, the user may confirm that a purchase is fraudulent, and the generator may provide the user response to the business. Based on the user response, the business may provide additional information to the generator, and the generator may generate a second web page allowing additional user input. Upon entry of a sufficient user response, the user interaction may end.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
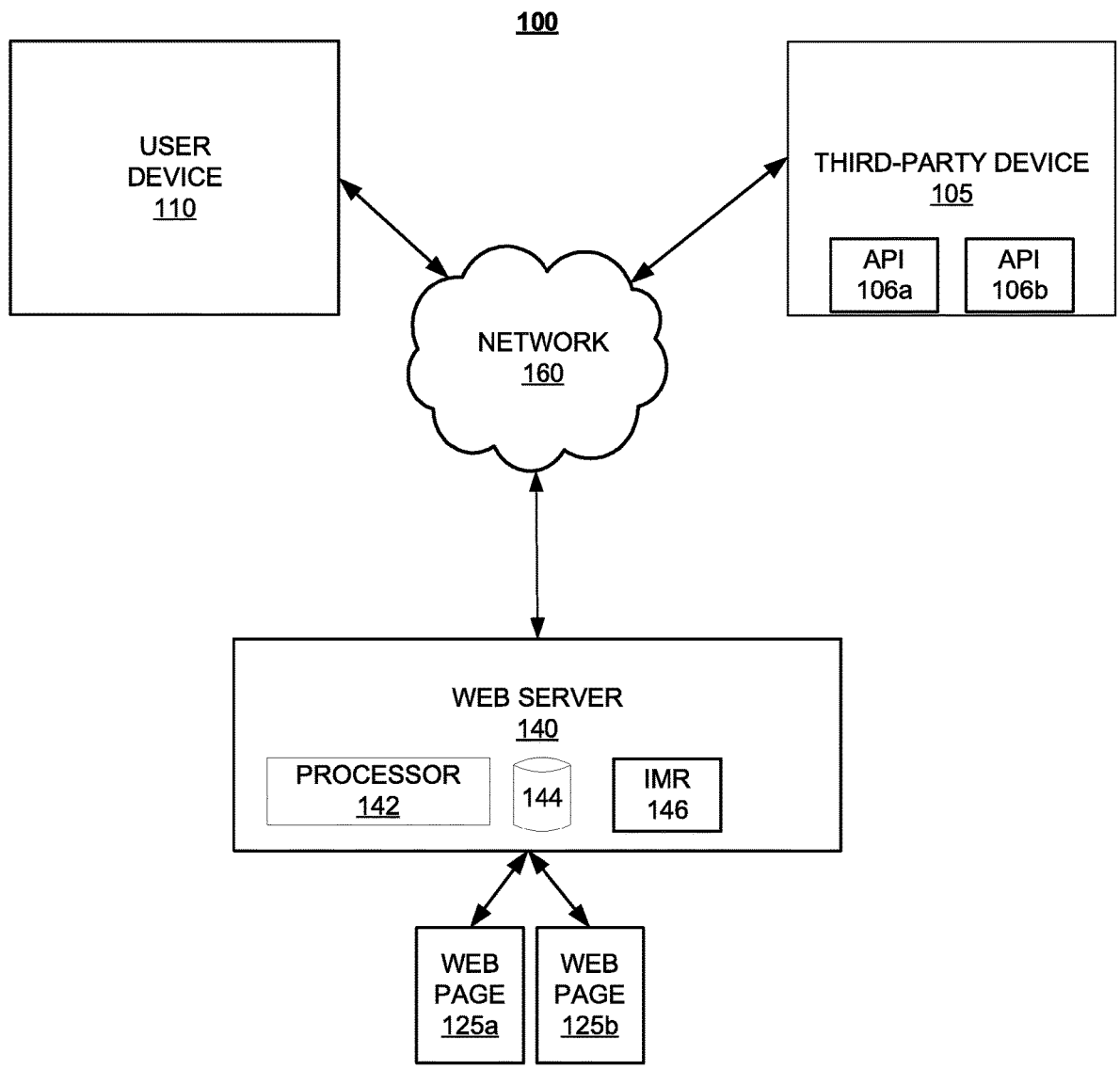
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 includes one or more user devices 110, one or more third-party devices 105 which include one or more applications and/or application programming interfaces (e.g., APIs) 106a and 106b, a network 160, a web server 140 which may include a processor 142, a database 144, an interactive message router (IMR) 146, and one or more web pages 125a and 125b generated by the web server 140. As non-limiting examples, the user device 110 may be a personal computer, a smartphone, a laptop computer, a tablet, or other personal computing device. The network 160 may include a network of interconnected computing devices more commonly referred to as the internet. The web server 140 may include one or more physical or logical devices (e.g., servers). The user device 110 may run and display one or more applications and the related output(s) of one or more applications (APIs) 106a and 106b associated with the third-party device 105. The user device 110 may include an address associated with a user account. An example computer architecture that may be used to implement one or more of the user device 110, the third-party device 105 and the server 140 is described below with reference to FIG. 6.

In certain implementations according to the present disclosure, the third-party device 105 may include one or more APIs 106a and 106b. The APIs 106a and/or 106b may receive user input data through the network 160 and through the web server 140 from the user device 110. In some embodiments, the third-party device 105 transmits user-specific information from the APIs 160a and/or 160b to the IMR 146 for creation of a first web page 125a and/or a second web page 125b. According to some embodiments, the third-party device 105 may generate an indication for a digital alert, wherein the digital alert is generated and transmitted through the network 160 by the processor 142 of the web server 140 to the user device 110. In some embodiments, user-specific information associated with a user account may be transmitted to the processor 142 by the third-party device 105 through the network 160. According to some embodiments, the third-party device 105 may receive indications of user input sent from the web server 140 through the network 160. The third-party device 105 may communicate with the processor 142 and/or the user device 110 through an interactive session. In some embodiments, the third-party device 105 may send one or more indications for additional user interaction.

Turning to the user device 110, in some embodiments, the user device 110 receives a message from the web server 140 through the network 160. According to some embodiments, receiving the message at the user device 110 may involve receipt at a user address associated with the user account. In some embodiments, the address associated with the user account may be an email address, a short message service (SMS) address, and the like. The user device 110 may send the web server 140 an indication of a request to access a web page link associated with the message through the network 160. In some embodiments, the user device 110 may be a part of a secure communications link with the processor 142. The user device 110 may be directed to the web page 125a or the web page 125b via the secure communications link. In some embodiments, the user device 110 may receive communications from a third-party device 105 through the network 160. Communications to and from the user device 110 within the interactive session may be stored in an activity log. In some embodiments, the user device 110 may display one or more web pages 125a and/or 125b from the web server 140 through the network 160. The user device 110 may communicate with the processor 142 and/or the third-party device 105 through an interactive session. In some embodiments, the user device 110 includes a user device identifier. The user device identifier may be a browser user agent, or any other unique identifier capable of allowing identification of the user device 110. Non-limiting examples of other unique identifiers may include a media access control (MAC) address and an internet protocol (IP) address.

In an example scenario of the present disclosure, the web server 140 may include one or more processors 142, one or more databases 144, and one or more interactive message routers (IMRs) 146. According to some embodiments, the processor 142 may receive an indication for a digital alert associated with a user account of a user from a third-party device 105. The processor 142 may establish an interactive session and a session identification, wherein the session identification is associated with the interactive session. The interactive session may allow communication between the processor 142, the third-party device 105, and the user device 110. That is, in some embodiments, the processor 142 will ignore communication from the third-party device 105, and the user device 110. The interactive session may include an activity log that stores communications and data to and from the user device in association with a subject of the digital. In some embodiments, the activity log may be stored in the one or more databases 144.

In some embodiments, the processor 142 may generate a message that includes a web page link associated with the session identification. The processor 142 may output the message for transmission to an address associated with the user account. According to some embodiments, the web server 140 transmits the message outputted by the processor 142. The processor 142 may receive an indication of a request to access the web page link from the user device 110. In some embodiments, upon receipt of the indication of a request to access the web page link from the user device 110 and authentication of the session identification, the processor 142 establishes a secure communications link inaccessible to other user devices. In some embodiments, a further authentication may be required to establish a secure communications link inaccessible to other user devices (e.g., user required to enter a valid CVV). According to some embodiments, based on the indication for the digital alert and the session identification, the processor 142 may access user-specific information associated with the user account from the third-party device 105. More specifically, in some embodiments, the IMR 146 accesses the user-specific information associated with the user account from the third-party device 105. In some embodiments, based on the indication for the digital alert and the user-specific information, the processor 142 generates a customized web page 125a which may include user-specific information associated with the user account and at least one user input field. Responsive to receipt of an indication for additional user interaction, the processor 142 may generate a second customized web page 125b which may include user-specific information associated with the user account and at least one user input field. According to some embodiments, the generation of a customized web page 125a involves the IMR 146 retrieving the session identification and the alert configuration. The alert configuration may provide an indication as to which third-party device to interact with, user identification information, a pre-determined session expiration period, predetermined page templates to generate one or more customized pages, and an indication of which API of the third-party device 105 to call. The features associated with the alert configuration may lower the amount of interaction needed with the third-party device 105. For example, in some embodiments, because the alert configuration provides certain information, the third-party device 105 does not need to be consulted to determine said information. Furthermore, because certain page templates may be predetermined, each alert configuration may be relatively compact for data transmission and processing requirements. Based on the information obtained from the alert configuration, the IMR 146 may interact with the third-party device 105 to call an API 106a and/or 106b. In some embodiments, the processor 142 may output for transmission an indication of user input data to the third-party device 105.

One of ordinary skill will recognize that the web server 140 may involve one or more distinct devices, wherein the functionality ascribed to the web server 140 is performed by and/or distributed between the one or more devices. Similarly, the third-party device 105 may involve one or more distinct devices, wherein the functionality is performed by and/or distributed between the one or more devices. As a non-limiting example, a first third-party device 105 may provide an alert instruction to a first web server 140 device. The first web server 140 device may generate and send the digital alert to the user device 110. A second web server 140 device may receive the indication of a request to access the web page link from the user device 110, and the second web server 140 device may interact with the second third-party device 105 to generate interaction specific web pages.

Figure 2:
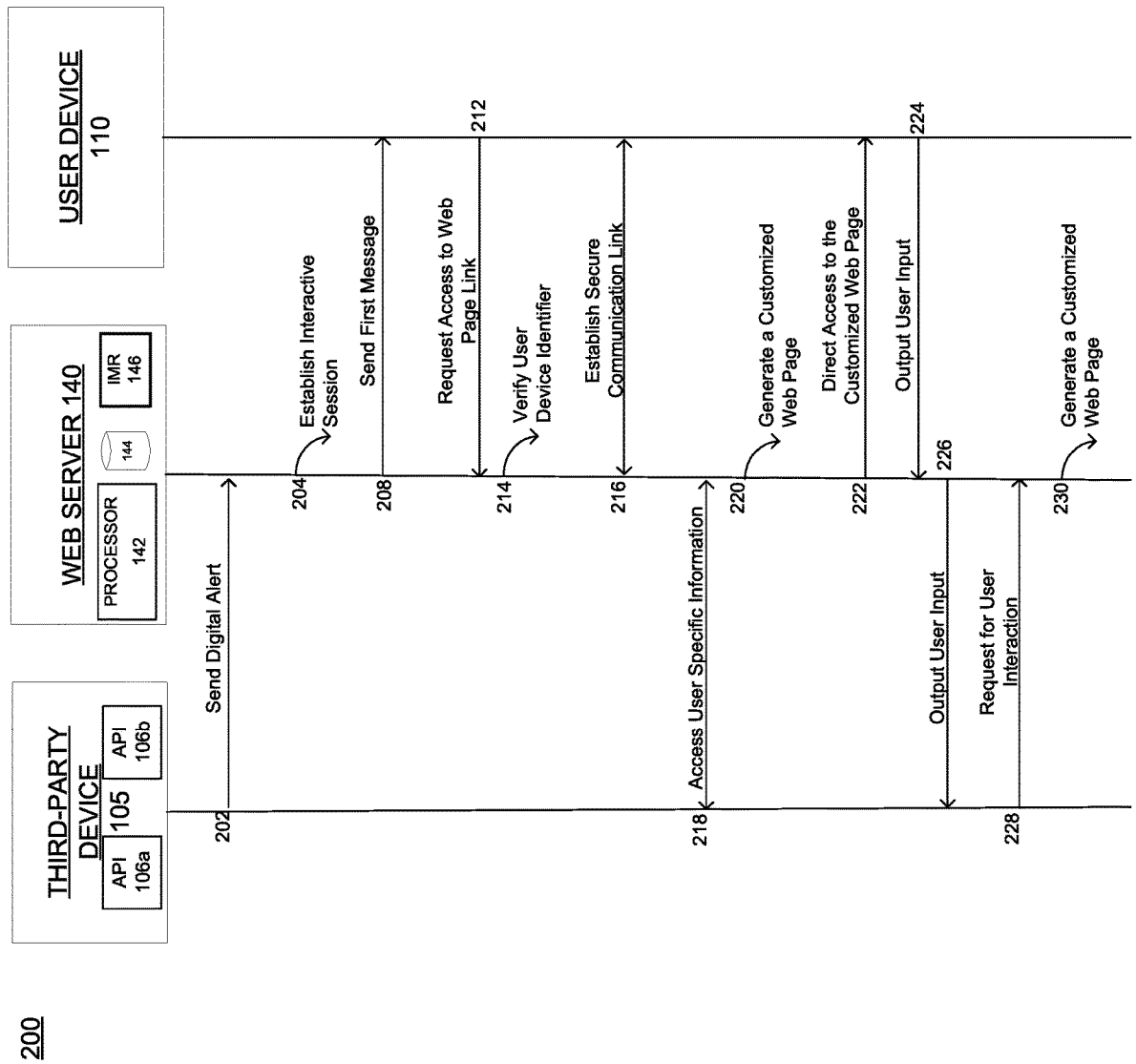
FIG. 2 is an example timing diagram of providing authenticated one-click access to a customized user interaction-specific web page.

FIG. 2 illustrates an example timing diagram of providing authenticated one-click access to a customized user interaction-specific web page. According to some embodiments, at 202 the third-party device 105 transmits an indication for a digital alert to web server 140, wherein the indication for the digital alert is associated with a user account of a user. The indication for the digital alert may include web page template instructions for configuring a customized web page 125a and/or 125b. The indication for the digital alert may indicate a user transaction. For example, in some embodiments, the indication for the digital alert may indicate a fraud alert, a spending limit alert, a purchase confirmation alert, or other associated customer alerts. At 204, based on the indication for the digital alert, the web server 140 establishes an interactive session. The interactive session may have a first session identification associated therewith. The interaction session may also contain a sequence identification used to track each interaction within a session (e.g., each time a user clicks a link or messages are traded). The web server 140 generates a first message (e.g., a digital alert) based on the indication for the digital alert. The first message includes a web page link associated with the first session identification. At 208 the web server 140 transmits the first message to the user device 110, wherein the first message is directed to an address associated with the user account where the address is accessible to the user device 110. In some embodiments, the address associated with the user account may be an email address, and SMS address, or the like.

At 212, (e.g., after receiving an indication of a user's intent to access the web page link) the user device 110 requests access to the web page link included in the first message from the web server 140. At 214, the web server 140 may verify the attempted access. For example, the web server may compare the user device identifier with a stored user device identifier. The user device identifier may be transmitted from the user device 110 with the request to access the web page link at 212. In some embodiments, the user device identifier may include a browser user agent, or the like.

At 216, the web server 140 may establish a secure communications link with the user device 110, wherein the secure communications link is inaccessible to other user devices. The establishment of the secure communications link allows the web server 140 access to request user specific information from the third-party device 105. At 217, the web server 140 identifies the alert configuration to determine which third-party API to access. At 218, the third-party device 105 transmits user specific information to the web server 140. At 220, after user specific information has been accessed, the web server 140 generates a custom web page based on the user-specific information. The custom web page may include user-specific information associated with the user account and at least one user input field. The user input field may include a plurality of radio buttons, one or more text boxes, or one or more links. In some embodiments, the indication of the user input data includes data representative of the user input field. At 222, the web server 140 directs the user device 110 to the customized web page via the secure communications link. At 224, the user device 110 then transmits a user selection to the web server 140. At 226, the web server 140 may transmit an indication of the user input to the third-party device 105. A request for additional user interaction at 228 from the third-party device 105 may be transmitted to the web server 140. Upon receipt, the web server 140 may generate a second customized web page at 230.

As a non-limiting example, the digital alert may be a fraud alert, the first user input is a selection of a fraudulent transaction, the update is flagging the transaction for suspension pending investigation, and the second user input is an indication that there are not more fraudulent transactions. In other embodiments, the digital alert may be a spending alert or any other alert associated with transaction in accordance with the user account.

For example, a user may click the link within a message which results in the display of a user-interaction specific web page. When the session is active, a user may click on the same link multiple times resulting in the display of a user-interaction specific web page. The user-interaction specific web page may be representative of user inputs received in previous interactions during the session. For each interaction (e.g., each time the link is clicked), the sequence identification increments. However, once the session has been deactivated (e.g., expired), if the user selects the link, a user-interaction specific web page may no longer be provided and the sequence identification will not increment for successive clicks.

Figure 3:
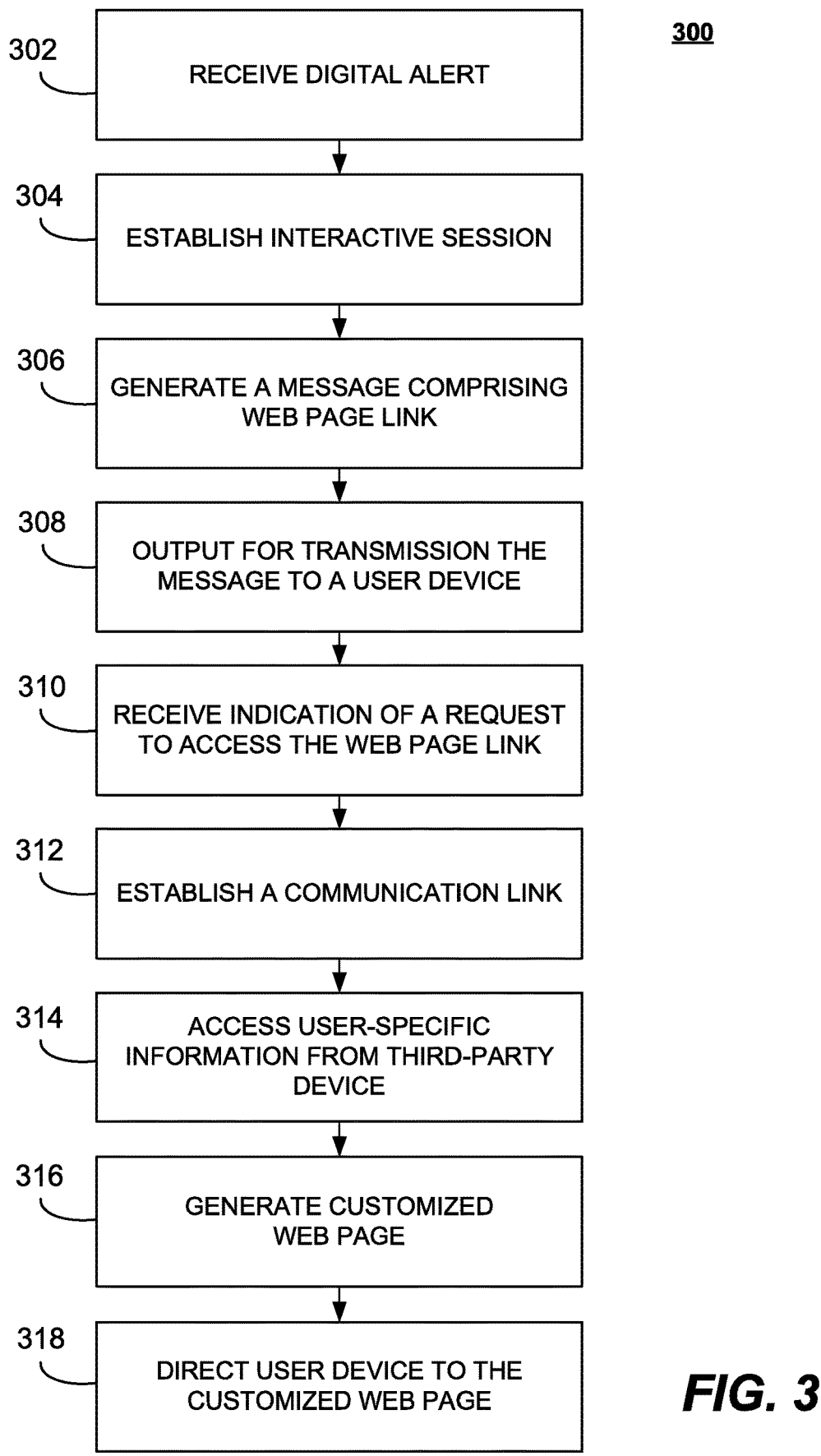
FIG. 3 is an example flow chart of a method for providing authenticated one-click access to a customized user interaction-specific web page.

FIG. 3 illustrates an example flow chart of a method for providing authenticated one-click access to a customized user interaction-specific web page. At 302, the web server 140 receives an indication for a digital alert from a third-party device 105. The indication for the digital alert is associated with a user account of a user. According to some embodiments, the indication for the digital alert comprises web page template instructions used by the web server 140 to configure the customized web page 125a. In some embodiments, at 304, based on the indication for the digital alert, the processor 142 establishes an interactive session. According to some embodiments, a first session identification, a unique identifier of the interactive session, may be associated with the interactive session. In some embodiments, the interactive session provides communication between the processor 142, a third-party device 105, and a user device 110. In some embodiments, the interactive session may include an activity log configured to store communications and data to and from the user device in association with a subject of the digital alert.

At 306, the processor 142 generates a first message including a web page link corresponding to the first session identification. In some embodiments, the first session identification is embedded within the first message (e.g., within the web page link). Next, at 308, in some embodiments, the processor 142 outputs the first message (e.g., a digital alert) to the user device 110, wherein the message is directed to an address associated with the user account. As non-limiting examples, the address may comprise an email address, SMS address, an address associated with push notifications, or any combination thereof.

At 310, after the user of the user device 110 clicks on the web page link, the processor 142 receives an indication of a request to access the link from the user device 110. In some embodiments, the indication of the request to access the web page link comprises a user device identifier associated with the user device 110. In some embodiments, the user device identifier may include a browser user agent, or another unique identifier of the like. According to some embodiments, at 312, the processor 142 establishes a secure communications link with the user device 110, wherein the secure communications link is inaccessible to others. In some embodiments, prior to establishing the secure communications link, the web server 140 may authenticate the user device 110. For example, the web server 140 may check the user device identifier for a match to a stored user device identifier that is associated with the user account.

After establishment of the secure communication link, the processor 142 may identify the alert configuration data, at 314. The alert configuration data may provide the processor 142 with data regarding which API to access from the third-party device 105. Responsive to a user's indication of a request to access the web page link from the user device 110, at 316, the processor 142 accesses user-specific information from the third-party device 105 based on the indication for the digital alert and the interactive session. In some embodiments, the user input field may comprise a plurality of radio buttons, one or more links, and/or one or more text boxes. In embodiments including the one or more links, the indication of the user input data comprises an indication of a request to access a first link of the one or more links. The processor 142 may output the indication of the user input data to the third-party device 105. At 320, some embodiments direct the user device 110 to the customized web page via the secure communications link.

In some embodiments, based on the indication for the digital alert and user-specific information associated with the user account, the processor 142 generates a customized web page at 318. The customized web page may include user-specific information associated with the user account and at least one user input field. In some embodiments, web page template instructions, e.g., included within the indication for the digital alert, may provide at least some of the basis of the data used to generate the customized web page. According to some embodiments, input from the user input field is received from the customized web page and outputted for transmission to the third-party device 105.

Figure 4:
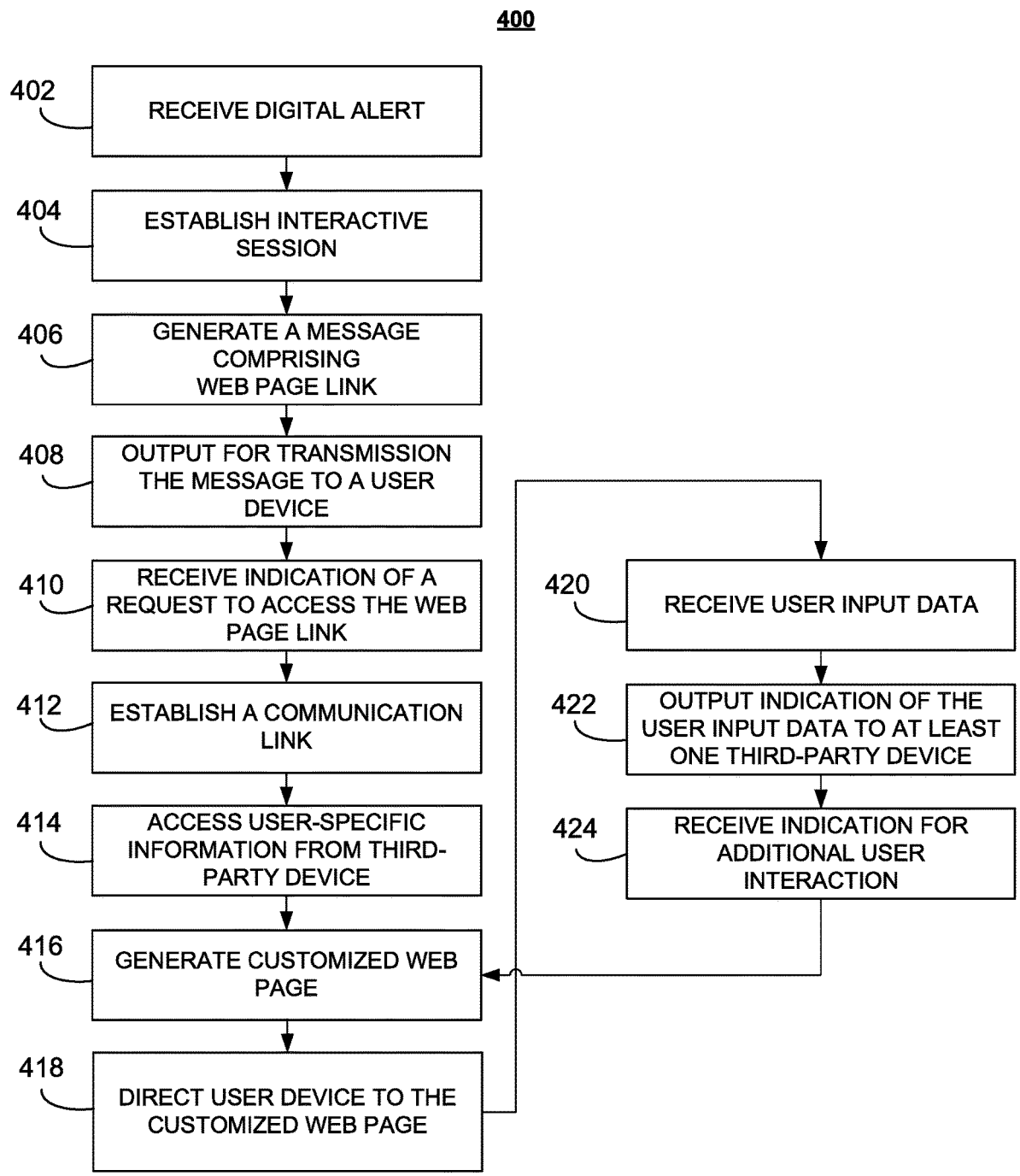
FIG. 4 is an example flow chart of a method for providing authenticated one-click access to a plurality of customized user interaction-specific web pages.

FIG. 4 illustrates an example flow chart of a method for providing authenticated one-click access to a plurality of customized user interaction-specific web page. Referring to FIG. 4, the method includes: receiving an indication for a digital alert at 402 from the at least one third-party device 105; establishing an interactive session at 404; generating a message (e.g., a digital alert) including a web page link at 406; outputting for transmission to the user device 110 the message at 408; receiving an indication of a request to access the web page link from the user device 110 at 410; establishing a communication link at 412; identifying an alert configuration at 414; accessing user-specific information from the third-party device 105 at 416; generating a customized web page at 418; and directing the user device 110 to the customized web page at 420. These features may be substantially similar to the corresponding features described above with reference to FIG. 3.

In some embodiments the method may further include, at 420, the processor 142 receives an indication of an input to the at least one first user input field, wherein the indication of an input is first user input data. At 422, the processor 142 outputs for transmission an indication of the first user input data to the third-party device 105. At 424, the processor 142 receives an indication for additional user interaction from the third-party device 105 (e.g., receives an indication that additional user input is desired by the third-party device 105). Responsive to receipt of an indication for additional user interaction, the processor 142 generates a second customized web page including user-specific information associated with the user account (e.g., additional user-specific information) and at least one second user input field at 416. In some cases, the elements described at 418-426 may repeat until no further user inputs are received or no further user inputs are desired (e.g., until the third-party device 105 provides no further indications of input fields).

Figure 5:
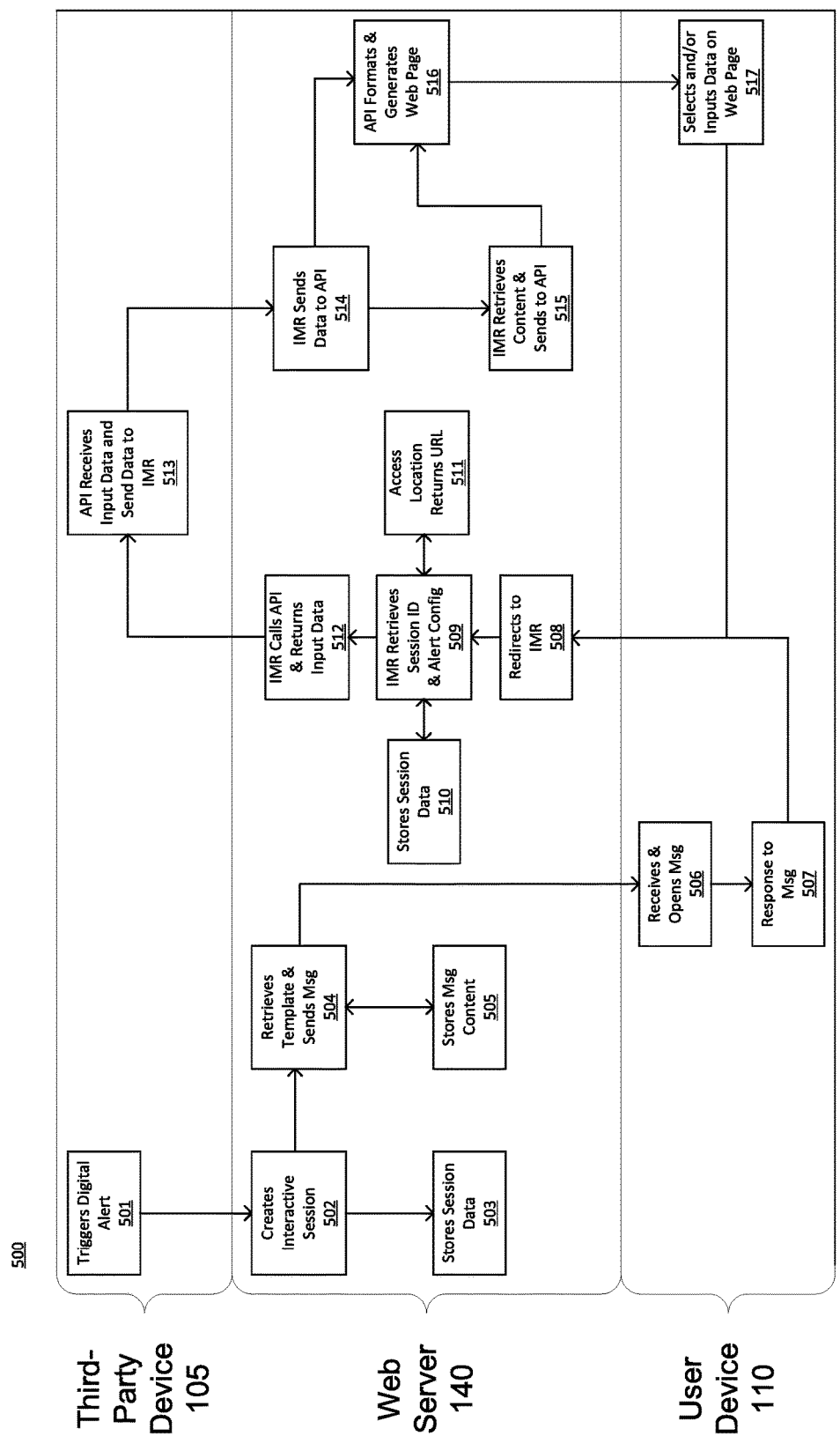
FIG. 5 is an example of a process flow diagram of a method for providing authenticated one-click access to one or more customized user interaction-specific web pages.

FIG. 5 illustrates an example of a process flow diagram 500 of providing authenticated one-click access to one or more customized user interaction-specific web pages. At 501, the third-party device 105 may trigger the provision of an indication for a digital alert to the web server 140. In some embodiments, for example at 502, the web server 140 creates an interactive session with an associated session identification. At 503, in some embodiments, the web server may store the session data in the database 144. At 504, the web server 140 may retrieve a message template and sends the message to the user device 110. Web server 140 may also log the message in association with the session identification.

At 506, a user may receive and open the message at a user address associated with the user device 110. At 507, the user may respond to a portion of the message, wherein a user response and/or a user input is requested. After a user response, the user device 110 may transmit an indication of the user response and/or user input to the web server 140. In some embodiments, and as shown at 508, the web server 140 receives the indication of the user response and redirects the indication to the IMR 146. At 509, the IMR 146 may retrieve the session identification and/or the indication for the digital alert data from the database 144. At 510, IMR 146 may update the interactive session to reflect the user response. Also, at 511, based on the indication for the digital alert data from the alert configuration, the IMR 146 may identify one of the first and second APIs 106*a* and 106*b* as corresponding to the session identification and/or the indication for the digital alert. For example, the digital alert may be a fraud alert or a spending alert, and the IMR 146 may identify the first or second API 106*a* and 106*b* from the database 144 as corresponding to a fraud alert or a spending alert. The alert configuration may indicate the type of alert. In some cases, the alert configuration may indicate whether the session is interactive or non-interactive. An interactive session may be a session that is interaction specific and implicate interactions with a user account. A non-interactive session may be notification-based and not require interaction with the user account. In some cases, a session identifier is only created for interactive sessions. In some embodiments, API correlations and corresponding access locations may be pre-established by the third-party device 105 or be conveyed with the indication for the digital alert. In some embodiments, for instance at 512, the IMR 146 calls the access location (e.g., the second API 106*b*) and requests the user specific information. At 513, the second API 106*a* may receive the user input data and sends the user specific information to the IMR 146.

At 514, IMR 146 sends the user-specific information to a web page API. At 515, the IMR 146 retrieves content (e.g., user input data, message data, or alert data) and sends the data to the web page API. At 516, the web page API formats and generates a customized web page (e.g., first customized web page 125*a*) and directs, and the web server 140 directs the user device 110 to the customized webpage. At 517, a user at the user device 110 may indicate a selection or enter further user input data used to generate a second customized web page (e.g., second customized web page 125*b*).

Figure 6:
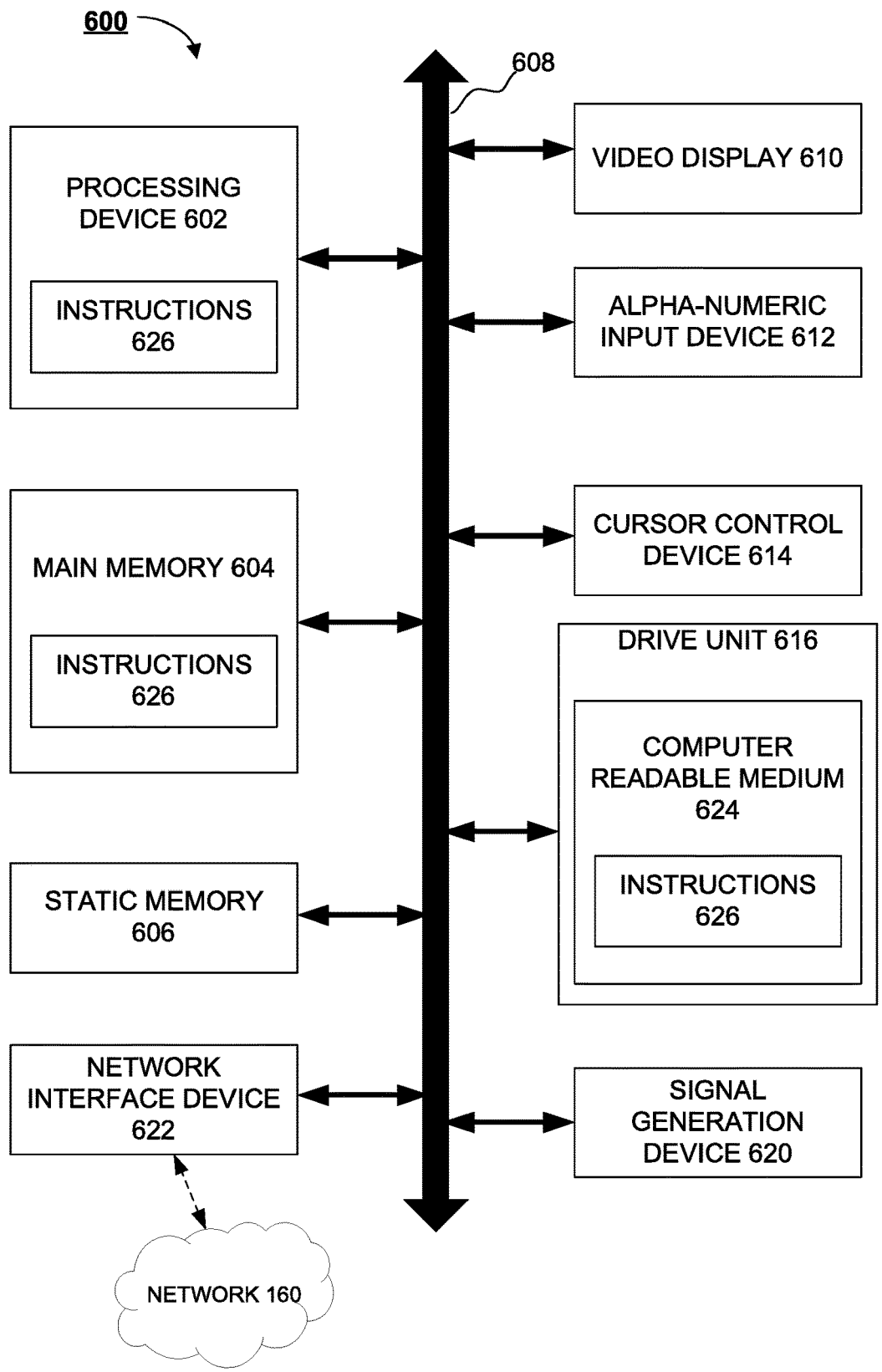
FIG. 6 is a block diagram of an example computer system that may implement certain aspects of the present disclosure.

FIG. 6 is a block diagram of an example computer system 600 that may implement certain aspects of the present disclosure. The computer system 600 may include a set of instructions 626 for controlling operation of the computer system 600. In some implementations, the computer system 600 may be connected (e.g., networked) to other machines in a Local Area Network (LAN), an intranet, an extranet, a satellite communications system, or the Internet. The computer system 600 may operate in the capacity of a server or a client machine in a client-server network environment, or as a peer machine in a peer-to-peer (or distributed) network environment. The computer system 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 600 is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random-access memory (DRAM) such as synchronous DRAM (SDRAM), etc.), a static memory 606 (e.g., flash memory, static random-access memory (SRAM), etc.), and a secondary memory 616 (e.g., a data storage device), which communicate with each other via a bus 608.

The processing device 602 represents one or more general-purpose processing devices such as a microprocessor, a microcontroller, a central processing unit, or the like. As non-limiting examples, the processing device 602 may be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the operations for electronically creating and trading derivative products based on one or more indices relating to volatility.

The computer system 600 may further include a network interface device 622, which is connectable to a network 160. The computer system 600 also may include a video display unit 610, i.e., a display (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a non-transitory storage medium 624 on which is stored one or more sets of instructions 626 for the computer system 600 representing any one or more of the methodologies or functions described herein. For example, the instructions 626 may include instructions for implementing an asset tracking device including a power source and power management system or subsystem for a container or a trailer. The instructions 626 for the computer system 600 may also reside, completely or at least partially, within the main memory 604 and/or within the processing device 602 during execution thereof by the computer system 600, the main memory 604 and the processing device 602 also constituting computer-readable storage media.

While the storage medium 624 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use cases describe examples of particular implementations of the use of authorized one-click access to a user-specific custom web page. These are intended solely for explanatory purposes and not limitation. In one case, a bank suspects fraudulent activity on a customer's account. The fraud prevention sector of the bank (e.g., third-party device 105) generates an indication for a digital alert that it sends to a server (e.g., web server 142). The server establishes a log for interactions with the customer. The server generates and sends a text message (e.g., a digital alert) containing a web link to the customer's cellular phone (e.g., user device 110). When the customer clicks the link, the cellular phone sends a request to the server (e.g., web server 142). The server communicates with the bank to gather user data, generates a web page customized for the customer and based on the fraud alert, and directs the customer's cellular phone to the customized web page. When the web page displays, no customer authorization (e.g., account log-in) is required. Instead, the customer is automatically authorized to access a web page containing information specific to the customer's account. The customized web page can show recent account transactions and request a response to the validate the transaction. The server communicates the customer's responses to the bank, which can either terminate the session (e.g., if the customer indicates that the transaction is valid) or request additional customer input (e.g., if the customer indicates the transactions are fraudulent). The bank may supply the server with additional user account information and/or customer requests, and the server generates a second customized web page for the customer. For example, the second customized web page requests information regarding the customer's last authenticated purchase. The server may continue supplying customer responses to the bank and generating customized web pages for the customer until the bank is satisfied. For example, once the fraud sector of the business receives sufficient information, the server may generate a termination webpage to alert the user that no more interactions are necessary. Thereafter, the server no longer generates further user-specific custom web pages, but the session may remain active. In some cases, once the fraud sector of the business receives sufficient information, the server may deactivate the session such that no further interactions with the user account are possible through the web-link. In some instances, the session may have an expiration (e.g., only valid for a particular time period), or may only be valid for a certain number of interactions (e.g., a capped sequence listing).

In another case, a bank notices a customer's spending amount is approaching his account limit. The customer account sector of the bank (e.g., third-party device 105) generates an indication for a digital alert that it sends to a server (e.g., web server 142). The server generates and sends a text message (e.g., a digital alert) containing a web link to the customer's cellular phone (e.g., user device 110). This message can reflect that the customer is approaching his account limit. When the customer clicks the link, the cellular phone sends a request to the server (e.g., web server 142). The server communicates with the bank to gather user data, generates a web page customized for the customer and based on the account limit alert, directs the customer to the customized web page. The web page includes information specific to the customer's account, but does not require active authentication (e.g., account log-in) by the customer. The customized web page may show recent transactions, notify the user of the impending spending limit, and provide the user with further options. For instance, the web page may provide an input asking if the user would like to increase his spending limit or pay off a portion of his card. The server communicates the customer's responses to the bank, which can either terminate the session (e.g., if the user indicates he would not like to increase the spending limit), or request additional customer input (e.g., if the user indicates he would like to increase the spending limit). The bank may supply the server with additional user account information and/or customer requests, and the server generates a second customized web page for the customer. For example, the second customized web page may request authorization to perform a credit check in order to increase the account's spending limit. Once the customer account sector of the business receives sufficient information, the bank stops requesting additional user input, the server stops generating customized web pages.

What is claimed is:

1. A method for providing one-click access to a customized web page, the method comprising:
   receiving, at a processor, an indication for a digital alert associated with a user account, the indication for the digital alert being selected based on a type of activity associated with the user account and comprising predetermined web page template instructions;
   establishing, by the processor and based on the indication for the digital alert, an interactive session comprising a unique session identification and a predetermined session expiration period;
   generating, by the processor and based on the indication for the digital alert, a message containing a web page link including the unique session identification;
   sending the message to an address associated with the user account;
   receiving, by the processor, a request to access the web page link from a user device associated with the address, the request including the unique session identification;
   determining, by the processor, that the interactive session has not expired based on the predetermined session expiration period;
   authenticating, by the processor, the unique session identification;
   accessing, by the processor, user-specific information associated with the user account based on the indication for the digital alert;
   generating, by the processor, the customized web page based on predetermined web page template instructions and the user-specific information; and
   directing the user device to the customized web page.

2. The method of claim 1, wherein the interactive session provides communication between the processor and the user device and further comprises an activity log configured to store communications and data to and from the user device in association with a subject of the indication for the digital alert.

3. The method of claim 1, wherein the address associated with the user account comprises at least one of an email address or a SMS address.

4. The method of claim 1, wherein
   the request to access the web page link comprises a user device identifier associated with the user device, and
   the method further comprises:
   determining, responsive to receiving the request to access the web page link, that the user device identifier associated with the user device matches a stored user device identifier that is associated with the user account; and
   establishing a secure communications link with the user device.

5. The method of claim 4, wherein the user device identifier is a browser user agent.

6. The method of claim 1, wherein accessing the user-specific information comprises:
   identifying, by the processor and based on the indication for the digital alert, an access location for acquiring the user-specific information from a device;
   transmitting a request for the user-specific information to the access location; and
   receiving, from the device, the user-specific information.

7. The method of claim 1, wherein the customized web page further comprises at least one user input field, and
   the method further comprises:
   receiving user input data as an input to the at least one user input field; and
   outputting the user input data for transmission.

8. The method of claim 7, wherein the at least one user input field comprises a plurality of radio buttons and the user input data comprises data representative of a selection of one of the plurality of radio buttons.

9. The method of claim 7, wherein the at least one user input field comprises a text box and the user input data comprises data representative of characters entered into the text box.

10. The method of claim 7, wherein the at least one user input field comprises one or more links, and the user input data comprises a request to access a first link of the one or more links.

11. The method of claim 1, further comprising a request to initiate an interactive session is received from a third-party device.

12. A method for providing authenticated one-click access to a customized web page, the method comprising:
    receiving, at a processor, an indication for a digital alert associated with a user account of a user, the indication for the digital alert being selected based on a type of activity associated with the user account and comprising web page template instructions;
    establishing, by the processor, an interactive session based on the indication for the digital alert;
    generating, by the processor, a unique session identification for the interactive session;
    generating, by the processor and based on the indication for the digital alert, a message comprising a web page link embedded with the unique session identification;
    sending the message to a user device, the message being directed to an address associated with the user account;
    receiving, by the processor, a request to access the web page link by the user device, the request including the unique session identification and being transmitted in response to a selection by the user of the web page link;
    authenticating, by the processor, the unique session identification;
    establishing a communication link with the user device;
    generating, by the processor based on the indication for the digital alert and the web page template instructions, a first customized web page comprising user-specific information associated with the user account and at least one first user input field;
    directing the user device to the first customized web page via the communication link;
    receiving, as an input to the at least one first user input field, first user input data;
    determining, by the processor, whether additional user input data is required;
    generating, by the processor upon determining that the additional user input data is required, a second customized web page comprising the user-specific information associated with the user account and at least one second user input field; and
    directing the user device to the second customized web page via the communication link.

13. The method of claim 12, wherein the indication for the digital alert comprises at least one of a fraud alert, a spending limit alert, or a purchase confirmation alert.

14. The method of claim 12, wherein the indication for the digital alert is received from at least one third-party device.

15. The method of claim 14 further comprising:
sending the first user input data to the at least one third-party device; and
receiving, from the at least one third-party device, a request for additional user input data.

16. The method of claim 12, wherein the address associated with the user account comprises an email address.

17. The method of claim 12, wherein the address associated with a user account comprises an SMS address.

18. The method of claim 12, wherein
the request to access the web page link comprises a user device identifier associated with the user device; and
the method further comprises determining, prior to establishing the communications link, that the user device identifier associated with the user device matches a stored user device identifier associated with the user account.

19. The method of claim 18, wherein the user device identifier comprises at least one of a media access control (MAC) address, internet protocol (IP) address, or a browser user agent.

20. The method of claim 12, wherein the at least one first user input field comprises at least one of a plurality of radio buttons and the first user input data comprises data representative of a selection of one of the plurality of radio buttons, a text box and the first user input data comprises data representative of characters entered into the text box, or one or more links and the first user input data comprises a request to access a first link of the one or more links.

* * * * *